June 16, 1953 R. G. WILLIAMS 2,642,553
LIGHTING CONTROL APPARATUS
Filed May 21, 1948 8 Sheets-Sheet 2
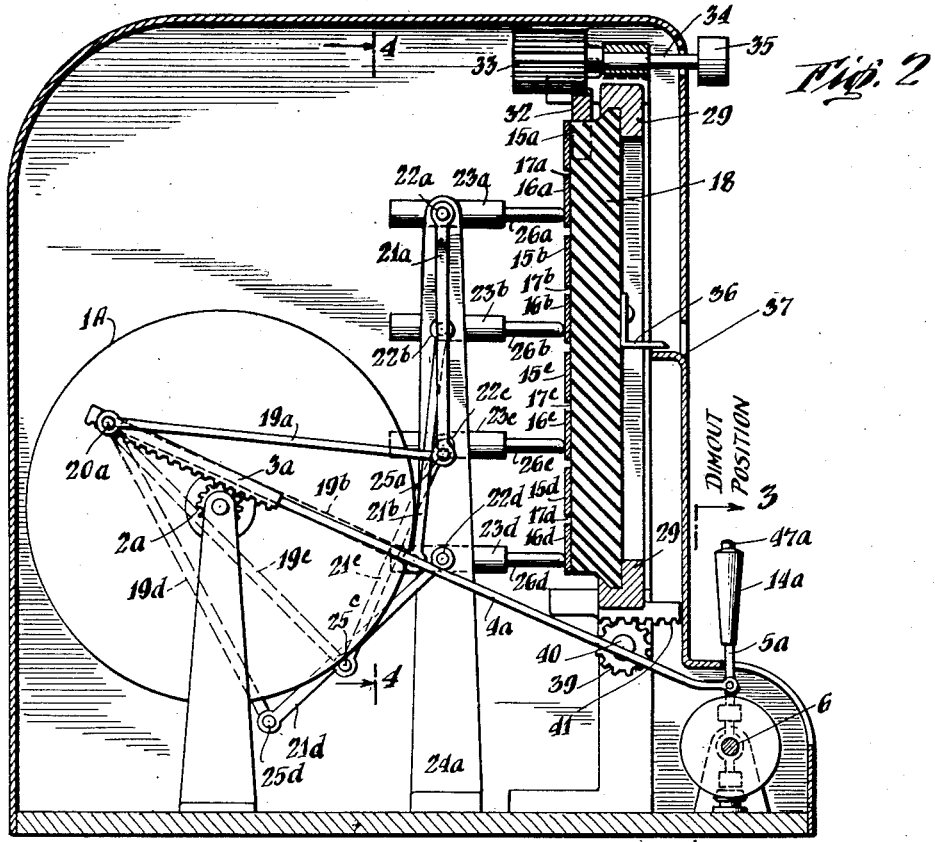
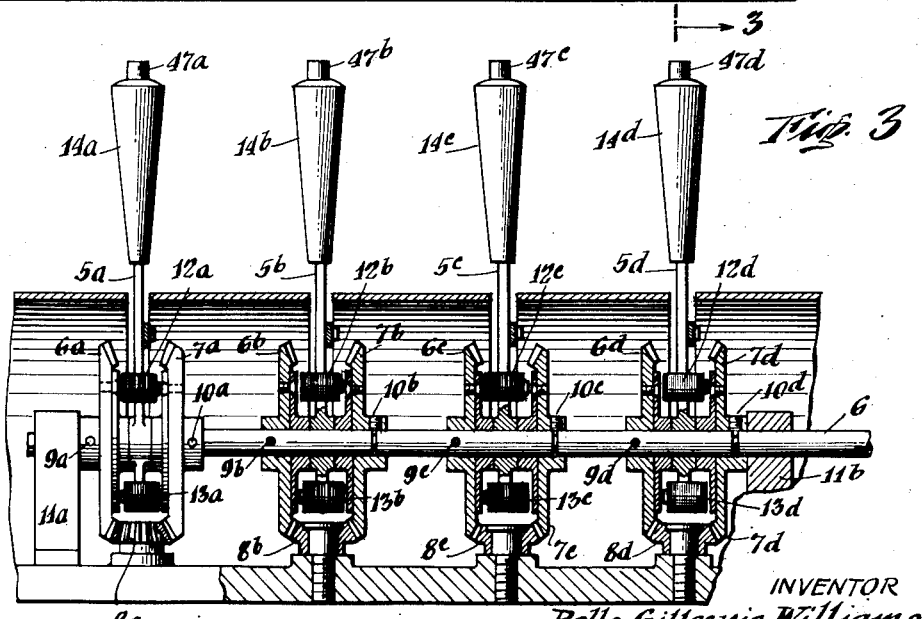
INVENTOR
Rollo Gillespie Williams
BY
ATTORNEYS June 16, 1953 R. G. WILLIAMS 2,642,553
LIGHTING CONTROL APPARATUS
Filed May 21, 1948 8 Sheets-Sheet 3
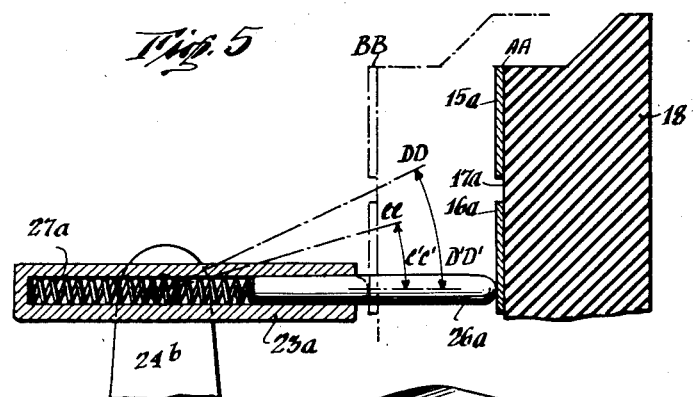
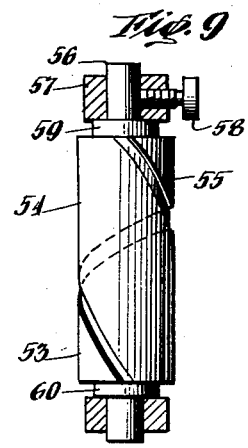
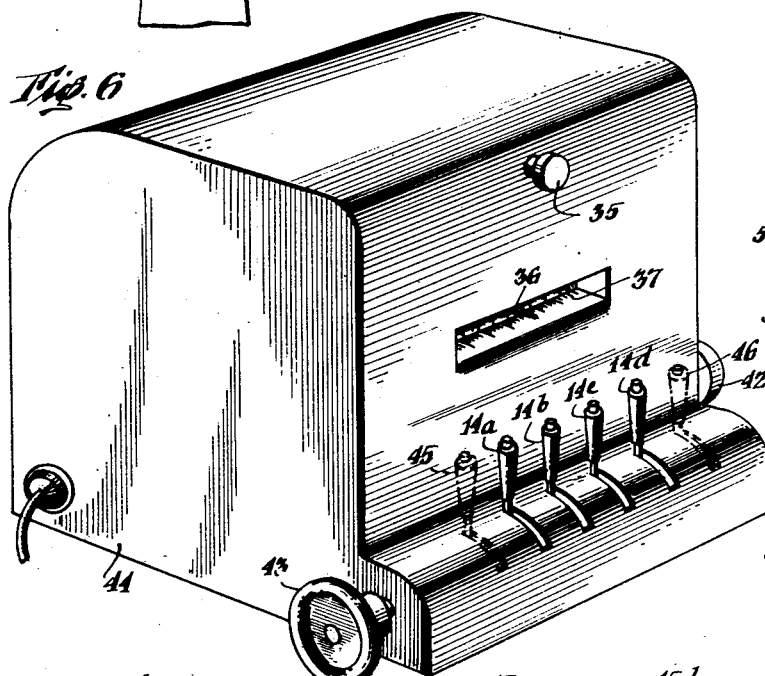
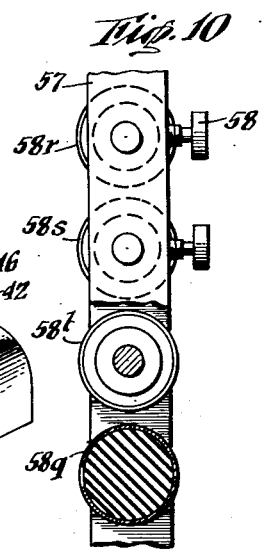
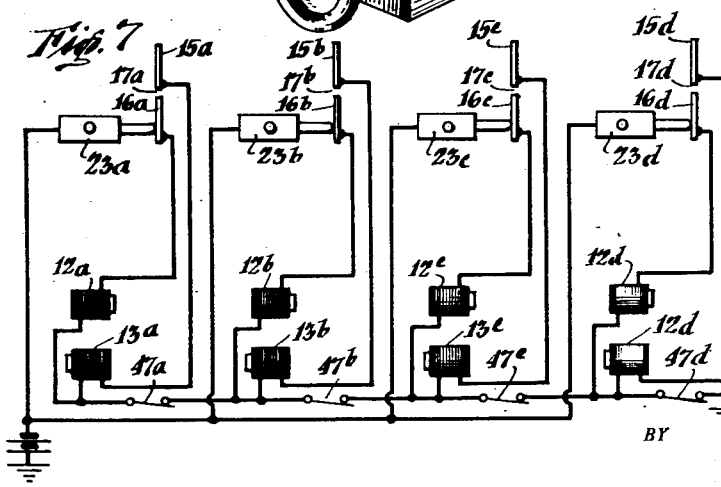
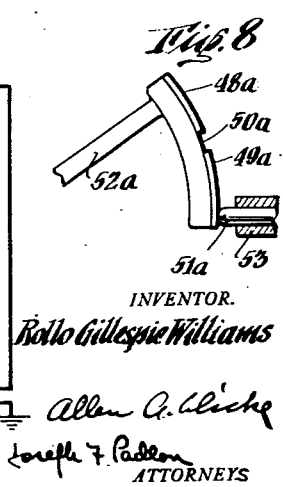
INVENTOR.
Rollo Gillespie Williams
Allen C. Cliche
Joseph F. Padlon
BY ATTORNEYS

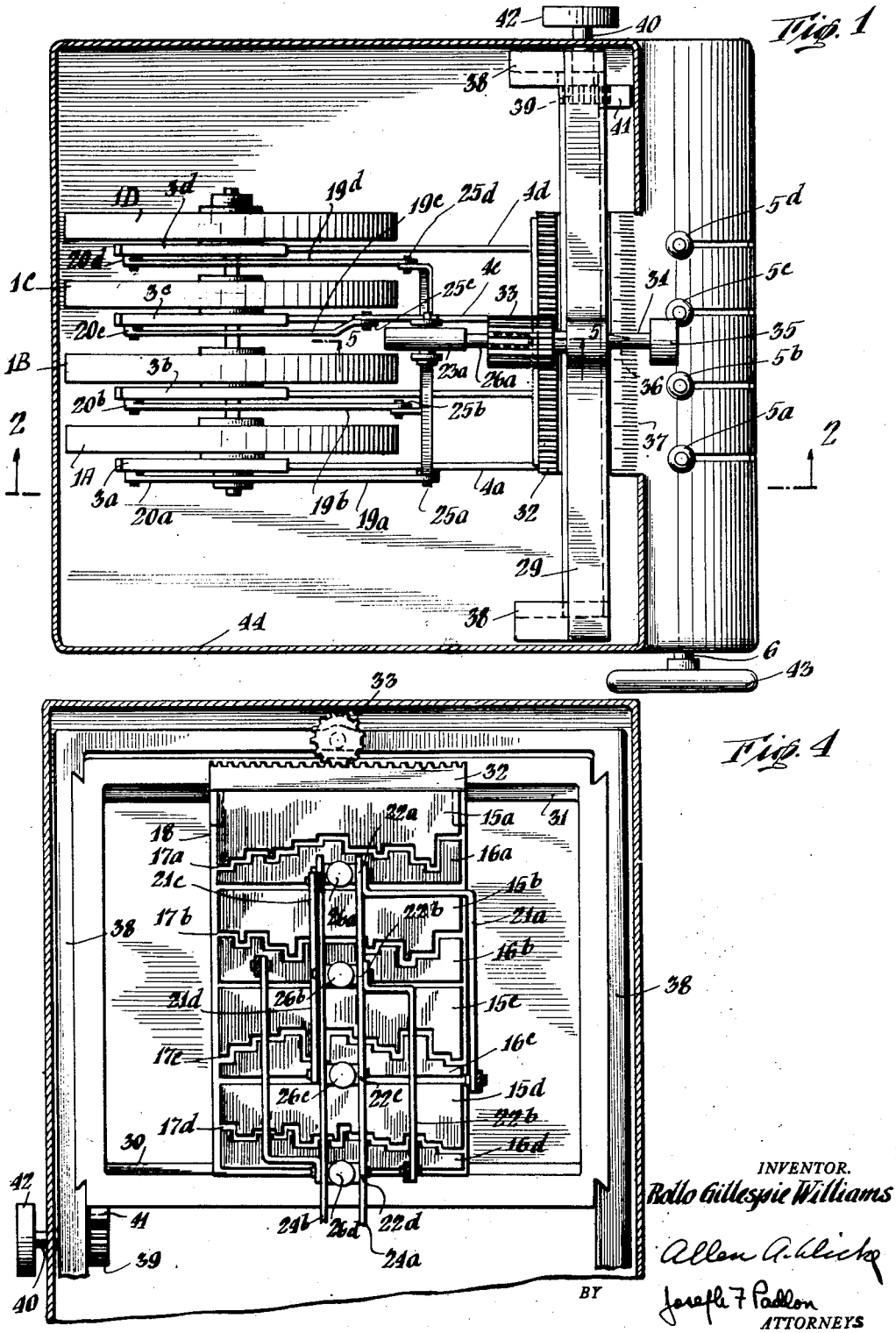

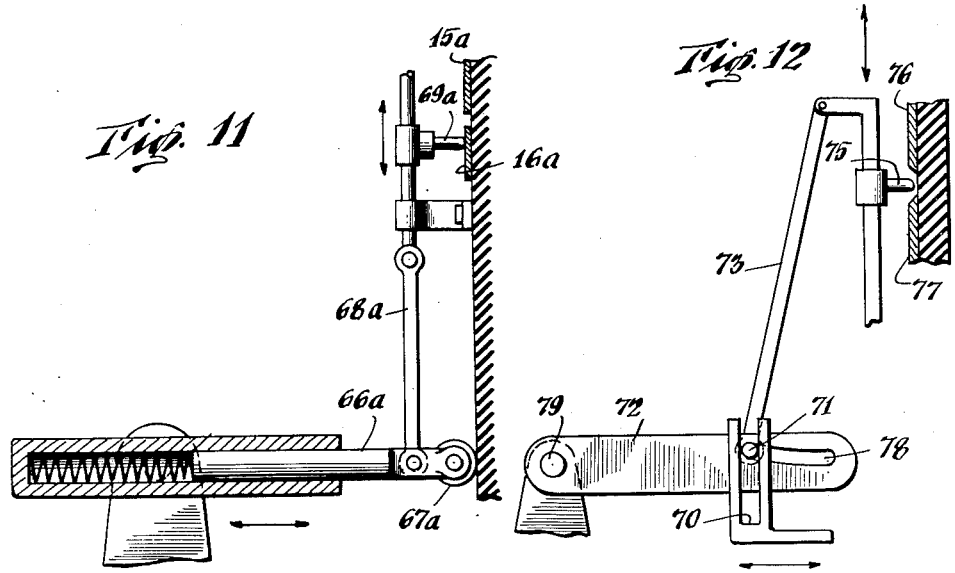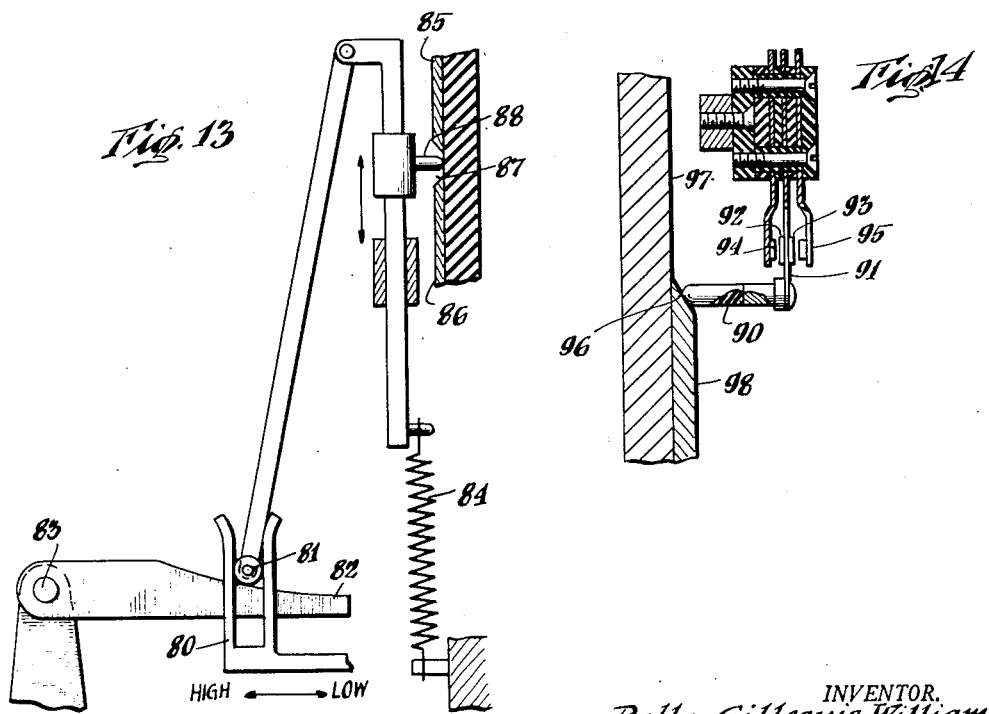

June 16, 1953   R. G. WILLIAMS   2,642,553
LIGHTING CONTROL APPARATUS
Filed May 21, 1948   8 Sheets-Sheet 5

INVENTOR.
Rollo Gillespie Williams
BY
ATTORNEYS

June 16, 1953　　　　R. G. WILLIAMS　　　　2,642,553
LIGHTING CONTROL APPARATUS
Filed May 21, 1948　　　　　　　　　　　　　　　8 Sheets-Sheet 8
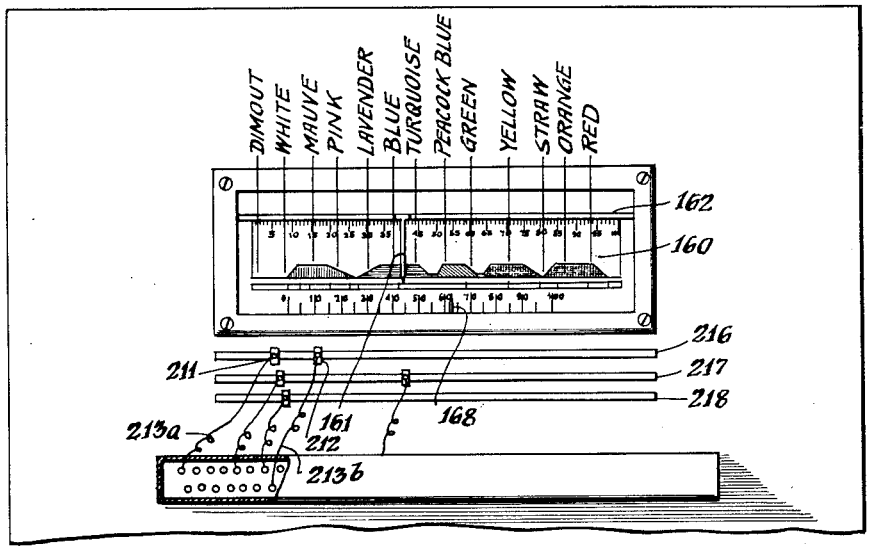
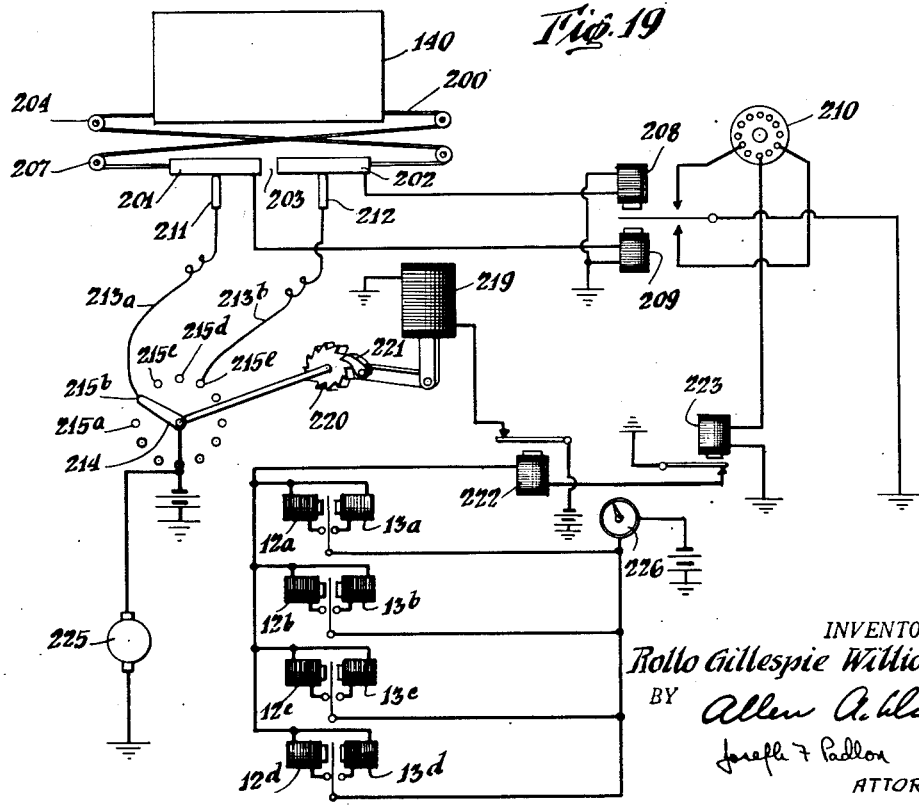
INVENTOR.
Rollo Gillespie Williams
BY
ATTORNEYS Patented June 16, 1953

2,642,553

UNITED STATES PATENT OFFICE 2,642,553

LIGHTING CONTROL APPARATUS

Rollo Gillespie Williams, Great Neck, N. Y., assignor, by mesne assignments, to Duro-Test Corporation, North Bergen, N. J., a corporation of New York Application May 21, 1948, Serial No. 28,306
In Great Britain May 28, 1947

35 Claims. (Cl. 315—292)

This invention relates to lighting control apparatus and has for an object to provide control apparatus to modify the intensity of one or more lights controlled thereby in accordance with presettable controlling elements, the desired control being made effective at a later time through a continuously or intermittently moving operating member (movable in one direction only) which may be common to a plurality of such light control elements.

Apparatus made according to the present invention, may be used to control the lighting intensity of a plurality of light sources of the same color or light sources emitting, say, white light, blue light and red light respectively. By varying the relative intensity of the component light sources, any desired results may be produced and if the light sources are different in color any desired resultant colors may be produced.

It is another object to provide such a device in which the overall intensity of a composite light effect may be varied without a change in character by simultaneously and proportionally varying the intensity of the various constituent light sources.

Another object is to provide such a device wherein the change from one resultant light effect, such as color, to the next selected one will take place gradually and in any desired order.

Such devices may be used for theaters, in which case the apparatus may serve to control a large number of lighting circuits supplying various spotlights, floodlights, footlights, trough and strip lights, etc. In such devices the lighting intensity of the various constituent lighting sources is usually varied by the use of dimmers which are usually rheostats which serve to introduce a variable resistance in the individual lighting circuits. It is to be understood, however, that any suitable means for varying the light intensity is within the purview of the present invention.

Another of the objects of this invention is to provide means which will enable the lighting requirements to be set up in advance in such a manner that a number of desired preset combinations of dimmers and lighting circuits may be reproduced at any time, irrespective of the order of the changes. The changes from one preset combination to another may take place at any desired speed and the dimmers or brightness regulators (when dimmer changes are involved) will always move directly to the required positions. The apparatus may be constructed for the presetting of a large number of lighting combinations.

Some or all of the lighting controlled may be of a single circuit equipment type giving only one color of light, in other words the combination of the lighting circuits is not dependent on the need for color blending, although in practice it may well be that some or all of the lighting circuits may be selected with this end in view. For example, a number of the circuits may have single lampbulb spotlights connected thereto and arranged to give white light, while other circuits may control multi-circuit (i. e., multi-color) equipment in which the circuits correspond with lighting of different colors and are blended to give desired color lighting effects. In such a case the lighting requirements from time to time in the lighting plot might require variations in the strength of the spotlighting as well as variations in the number of spotlights in use, while at the same time the number and strength of the circuits in the multi-color lighting equipment would vary according to the need for changes in the color of the lighting provided thereby.

A further object of the invention is to provide a control for multi-color lighting equipment of the kind which is suitable for use in show windows, dance halls, cinematograph theaters, interior lighting, etc., and it can be utilized for the reproduction of predetermined color lighting effects. It can also be utilized for the reproduction of various arrangements of single-color lighting either alone or in conjunction with color effects from multi-color lighting equipment.

A still further object of the invention is to provide control apparatus for any desired number of lighting circuits and/or dimmers (or other convenient form of brightness control) which can be governed from a single control apparatus, and if desired the whole of the circuits, say for a complete stage installation, can be determined from a single pre-set indicator with its associated operating mechanism according to this invention. Alternatively, it may be preferred to have a number of unit control mechanisms each governing a desired number of the lighting circuits. In the latter case means of collective operation of the various operating mechanisms may be provided.

This invention also provides means which will enable the overall lighting intensity of all the circuits in use to be varied so that a change in overall intensity is proportional (or very nearly proportional) to their original and relative strengths in each case. Thus, if an arrangement of dimmers first included dimmer A at 100%, dimmer B at 80%, dimmer C at 60% of full light and dimmer D at zero per cent, then a reduction of intensity to one half would result in dimmer A at 50%, dimmer B at 40%, dimmer C at 30% of full light while dimmer D remains at zero per cent, instead of dimmer A at 50%, dimmer B at 30% and dimmer C at 10% of full light, as would be the case if all four dimmers were to each move an equal amount. Among other things this enables a lighting arrangement to be varied in overall intensity without the various circuits losing their light relationship to each other.

Another object of the invention is to provide means which will enable someone to set up his own requirements for lighting changes and for the changes to be then automatically reproduced in a sequence as desired by him.

Means for experimentation with the lighting controls and dimmers can be provided and they can be operated independently of the present effects, or the pre-set effects can be modified and/or changed as required.

While the word "dimmer" is used in the following description, it is understood that any convenient form of brightness control may be employed, as, for example, electronic, auto-transformer, wire wound dimmers, etc. The type of dimmer illustrated in the accompanying drawings is a rotary action dimmer of the enclosed type, but it is to be understood that any other means for varying the intensity of the individual lights may be employed.

It is another object of the present invention to provide control apparatus for a lighting system including: a plurality of colored light sources with or without the addition of non-colored light sources, a dimmer for each light source, and operating means for each dimmer, which means are controlled by a single operating member moving in the same direction, which causes application of a source of mechanical power to any predetermined number of the dimmers to alter their setting in accordance with preset selector means and so to produce varying colored lighting effects. Preferably such a color lighting system includes a further means to control the rate of application of mechanical power to the dimmers to give a gradual change of color. Also it may include a further means simultaneously to adjust all operating means of the dimmers in substantially the same proportion to produce dimming or brightening of a particular color effect.

In accordance with a further aspect of the invention, the color lighting system includes a plurality of light sources producing colored light (it being understood that the expression "colored light" is intended to include unmodified light such as that emitted by the particular light source employed), a dimmer for each lamp, operating means for each dimmer, a pair of electrically-actuated clutches for each operating means to drive either in the dimming or the brightening direction, together with follow up means connected to each operating means, a movable surface, and a neutral path on the surface for each follow up means, the arrangement being such that one follow up means will energize one or the other clutch if it is away from its neutral path to cause movement of the dimmer to carry the follow up means back to its neutral path.

Viewing the invention in another aspect, it is an object to provide light intensity control means, a servo-mechanism to operate said intensity control means and a pattern to control the input of said servo-mechanism, whereby the light intensity will be adjusted in accordance with said pattern, means being usually provided for adjusting said pattern relative to the said input means.

In order that the invention may be clearly understood, a number of illustrative constructions will now be described with reference to the accompanying drawings, in which:

Fig. 1 is a plan view of one form of control apparatus, the casing being shown in section.

Fig. 2 is a sectional elevation of the control taken on the line 2—2 of Fig. 1.

Fig. 3 is a cross-section taken on the line 3—3 of Fig. 2.

Fig. 4 is a cross-section taken on the line 4—4 of Fig. 2.

Fig. 5 is a partial section taken on the line 5—5 of Fig. 1.

Fig. 6 is a perspective view of the complete control apparatus.

Fig. 7 is a schematic circuit diagram of the various parts of the control.

Fig. 8 shows a modified form of the movable circuit controlling means.

Fig. 9 and Fig. 10 show still further modified forms of the movable circuit controlling surface.

Figs. 11, 12, 13 and 14 show various modified forms of the circuit controlling switch means.

Fig. 18 shows a form of indicator for use with the apparatus of Fig. 15, together with an improved pre-set step-by-step control arrangement.

Fig. 19 shows a schematic circuit diagram indicating the working of the pre-set step-by-step control means, and Fig. 20 shows a modified form of movable surface for use in the apparatus according to Fig. 15.

Figure 15:
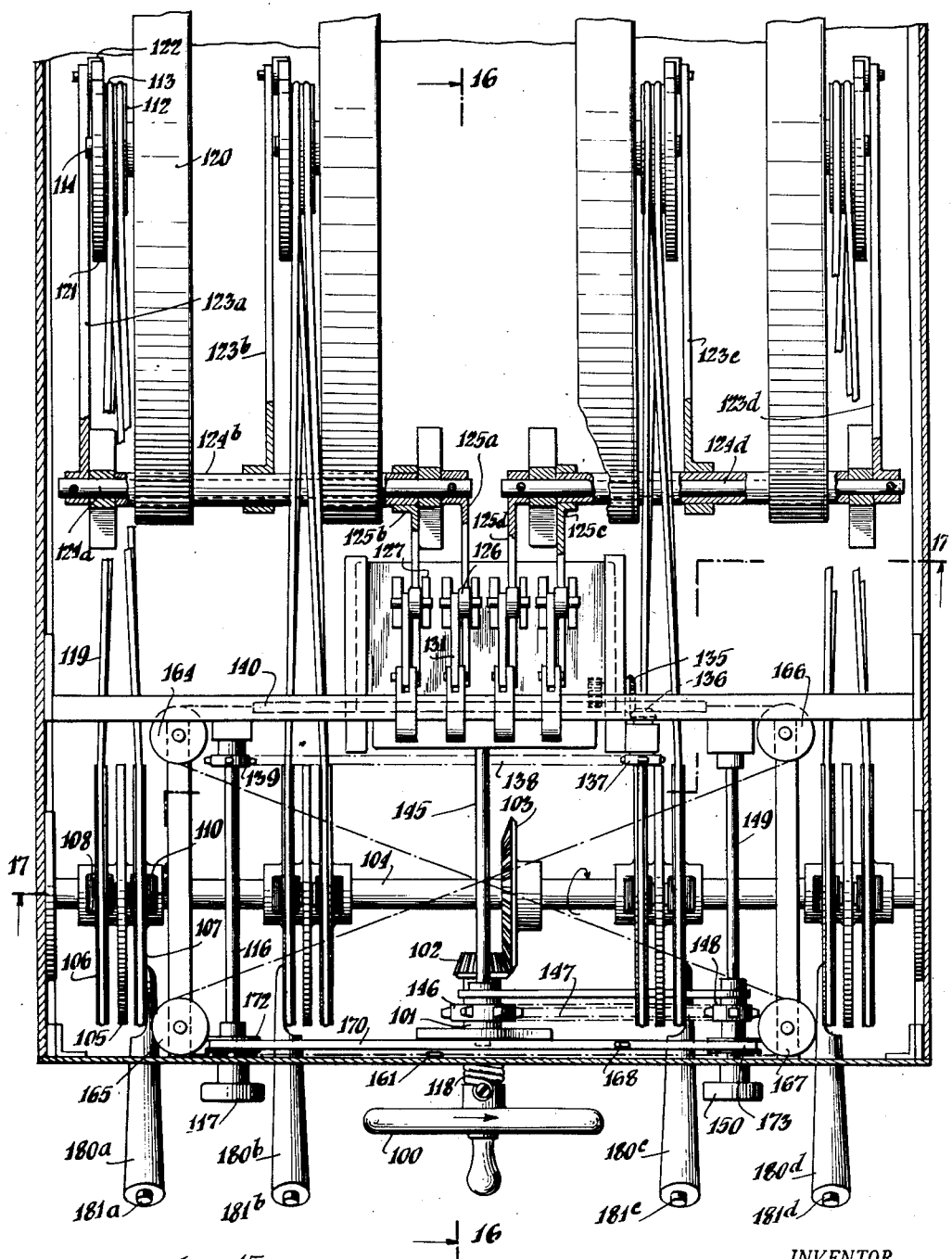
Fig. 15 shows a plan view of the interior of a modified form of control apparatus.

The illustrative apparatus of the form shown in Figs. 1 to 10 inc., may consist of a framework 44 in which are mounted by way of example four rotary stud-type totally enclosed dimmers 1A, 1B, 1C, 1D. Rotary motion is imparted to these dimmers by some convenient means, in this case a rack and pinion for each dimmer (2a—3a, 2b—3b, 2c—3c, 2d—3d) connected by link rods 4a, 4b, 4c, 4d respectively, to hand-operated levers 5a, 5b, 5c, 5d, respectively, mounted on the shaft 6. Individual hand operation of the dimmers can be obtained by manipulation of the handles 14a, 14b, 14c, 14d, fixed at the ends of the levers 5a, 5b, 5c, 5d, respectively.

The levers 5a, 5b, 5c, 5d are loosely mounted on the shaft 6, and each lever carries two electromagnets (12a and 13a, 12b and 13b, 12c and 13c, 12d and 13d) with the projecting part of the iron cores facing in opposite directions, so that electromagnet 12a, for example, will attach itself to the iron plate fastened to the inside face of the bevel wheel 7a, when energized; while magnet 13a will attach itself to the iron plate inside bevel wheel 6a, when energized. While there is a slight gap between the magnet cores and the iron plates when both coils are de-energized, by providing a small amount of play between the levers 5a, 5b, 5c, 5d and the shaft 6, either magnet can pull its mounting lever over slightly when energized so as to attach itself to the iron plate adjacent to it.

The levers and magnet coils just described are mounted so that each lever comes between a pair of bevel wheels 6a and 7a, 6b and 7b, 6c and 7c, 6d and 7d. One wheel of each pair, in this case 6a, 6b, 6c, 6d is fastened to the shaft 6 by means of screws 9a, 9b, 9c, 9d, while the other wheel of each pair is loosely mounted on this shaft but is prevented from moving sideways by pins 10a, 10b, 10c, 10d, which locate in corresponding grooves in the shaft 6. Each pair of bevel wheels, however, are linked by a third bevel wheel 8a, 8b, 8c, 8d respectively, so that motion can be imparted to the loosely mounted wheels 7a, 7b, 7c, 7d, if the shaft 6 to which are fastened the bevel wheels 6a, 6b, 6c, 6d, is rotated. The loosely mounted bevel wheels 7a, 7b, 7c, 7d, however, will rotate in the opposite direction to that of the shaft 6 and the wheels 6a, 6b, 6c, 6d.

If the shaft 6 is rotated, the levers 5a, 5b, 5c, 5d, will move in the same direction as the shaft if and while the magnet coils 13a, 13b, 13c, 13d, are energized but will move in the opposite direction if and while the magnets 12a, 12b, 12c, 12d are energized.

Figure 17:
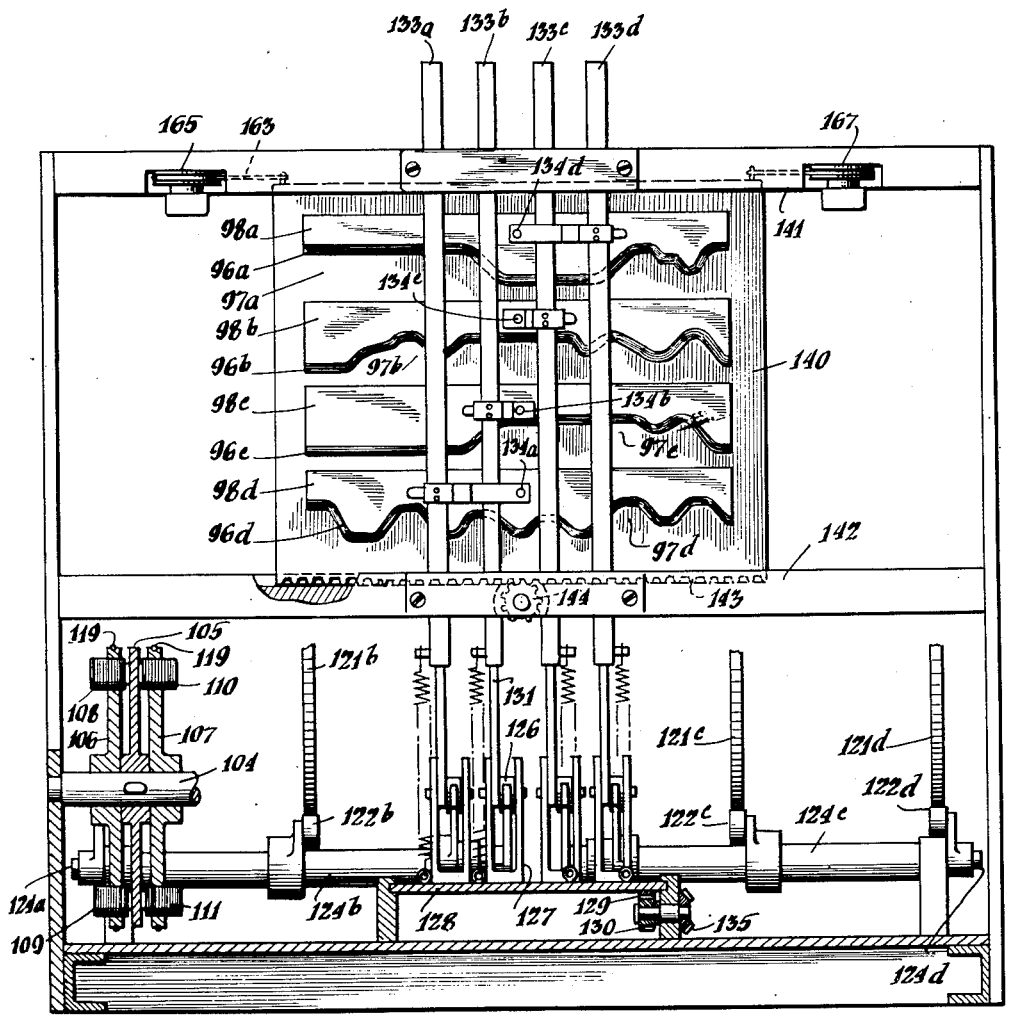
Fig. 17 shows an elevation of the apparatus of Fig. 15 showing the movable surface and follow up means taken on the line 17—17 of Fig. 15.

It will be seen from Fig. 7 that each pair of electromagnets are electrically connected to a pair of contact plates. Thus, magnet 12a is connected to contact plate 16a and magnet 13a is connected to contact plate 15a; magnet 12b to plate 16b and magnet 13b to plate 15b, etc. The four pairs of contact plates 15a—16a, 15b—16b, 15c—16c, 15d—16d are shown in Figs. 2 and 4 mounted upon a common base 18. It will be seen from Fig. 4 that there is a gap between each pair of contact plates, the four gaps being shown at 17a, 17b, 17c, 17d. While these gaps (or neutral paths) are shown in Fig. 4 as made up of a number of straight portions, it is to be understood that they may be formed as curvilinear paths, somewhat as shown in Fig. 17, in which event the slightest transverse movement of the contact plates may result in a change of position thereof in a vertical direction. The shape of the neutral paths of Fig. 4 (or Fig. 17) is always so designed as to give the desired light intensity at any given point along the length of each circuit controlling plate in relation to the intensity of the light controlled by the other plates. These circuit controlling plates constitute a pattern in the form of a neutral path which serves to control the circuits to give the light intensity predetermined by said pattern. The base 18 upon which the four pairs of contact plates are mounted is made of insulating material, or alternatively other means are taken to insulate the various contact plates from each other.

Electricity is directed at times to one or the other contact plate of each pair, by means of a contact brush. Fig. 5 shows a contact brush assembly in which a contact brush 26a is held in a holder 23a and pressed against the contact plate assembly by means of a spring 27a. Since there are four pairs of contact plates, there are four contact arm assemblies and these are shown in Fig. 2 at 23a, 23b, 23c and 23d. It will be seen that these brush-holders are pivoted at 22a, 22b, 22c, 22d between the upright supports 24a and 24b. These brush-holders have lever arms 21a, 21b, 21c, 21d attached to them so that movement of these levers will cause a corresponding movement of the brush-holders and the contact brushes 26a, 26b, 26c, 26d, and the latter will be able to move over the surface of the contact plates adjacent to them.

The lever arms 21a, 21b, 21c, 21d are shaped to terminate at different positions on plan as will be seen from Fig. 4 and the opposite ends to the brush-holder end of these levers are spaced out at approximately the same distance apart as the distances between the four dimmers 1A, 1B, 1C, 1D, so that they can be linked by connecting rods to the link assemblies which in turn connect the dimmers to the levers 5a, 5b, 5c, 5d.

Thus, the rack 3a which operates the pinion 2a on the dimmer 1a is connected from a pivot at 20a by means of connecting rod 19a to the lever 21a which is associated with the brush-holder 23a. Similarly, rack 3b is connected by rod 19b to the lever arm 21b which operates brush-holder 23b; ratchet 3c by means of rod 19c to lever arm 21c and brush-holder 23c; and rack 3d by means of rod 19d to lever arm 21d and brush-holder 23d. Thus, movement of the dimmer 1A will cause the contact brush 26a in the brush-holder 23a to move in accord with the dimmer. Similarly, the dimmer 1B will cause a corresponding movement of contact brush 26b; dimmer 1C a movement of contact brush 26c; and dimmer 1D a corresponding movement of contact brush 26d.

If no electricity is flowing from the contact brushes to the electromagnets 12a, 12b, 12c, 12d and 13a, 13b, 13c, 13d, then the dimmers can be moved freely by hand by means of the handles 14a, 14b, 14c, 14d, and the contact brushes 26a, 26b, 26c, 26d will move over their corresponding pairs of contact plates 15a—16a, 15b—16b, 15c—16c, 15d—16d, without anything happening as the result of these contacts. To permit this free movement when the apparatus is in normal use, the supply of electricity is broken by some convenient switch or switches, in the example under consideration, there being a switch of the press-button type at the end of each dimmer operating handle as shown at 47a, 47b, 47c, 47d. Thus, pressure of the button 47a by the thumb will break the supply of electricity to the electromagnets associated with the handle 14a and allow the dimmer 1A to be freely adjusted by hand. This is further shown in Fig. 7 where the switches are shown as part of the return feed from the electromagnet coils.

Figure 16:
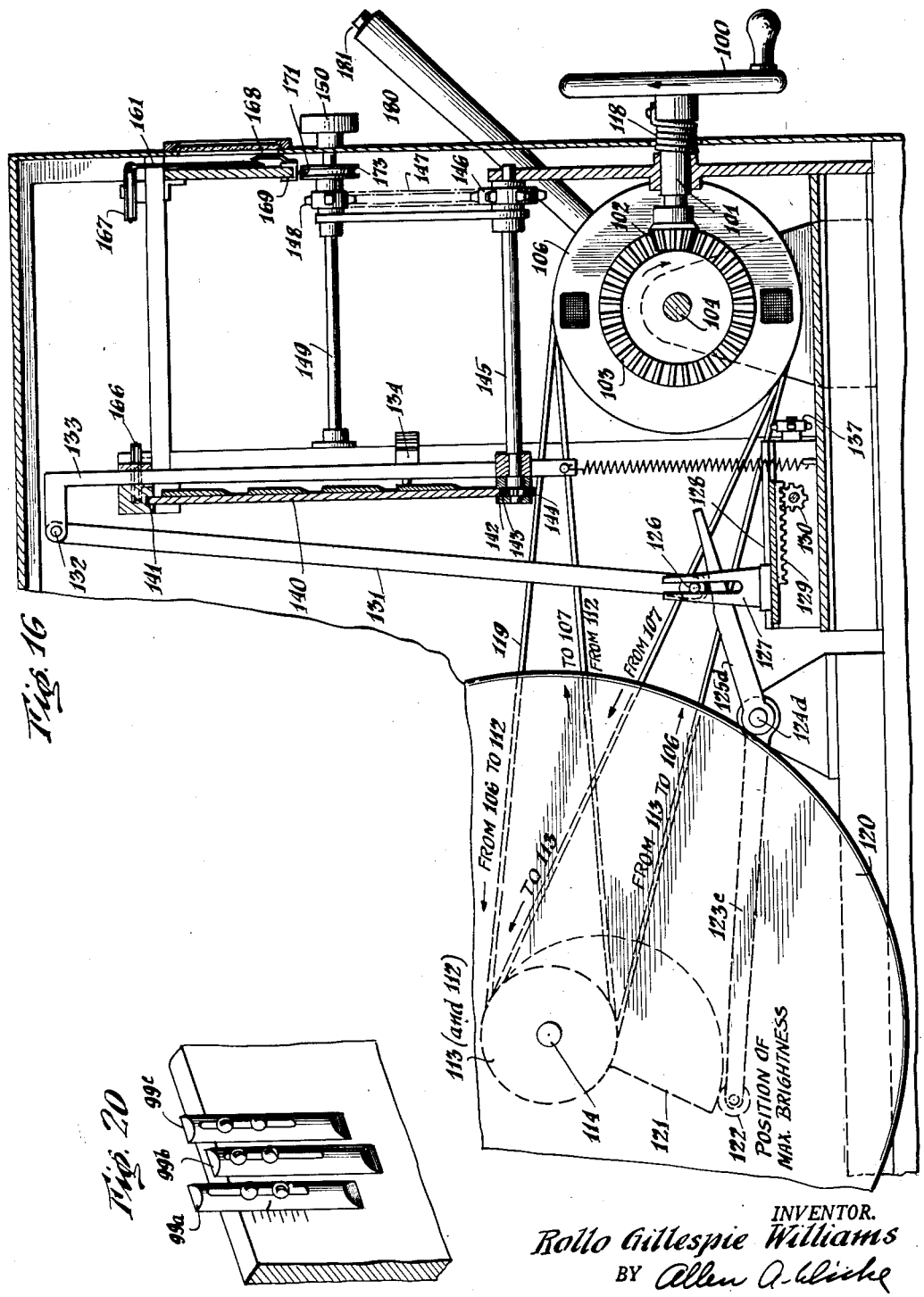
Fig. 16 shows a partial sectional elevation of the apparatus taken on the line 16—16 of Fig. 15.

When current is flowing through the contact plate circuits, however, the effect will be to energize one of the two electromagnet coils in each set, unless the contact brush happens to rest in the gap between a pair of contact plates, in which case that particular circuit will, of course, be broken. The said "gap" between the contact plates constitutes a neutral path which, when reached by the associated contact brush, will cause the electric circuit to the associated magnet to be broken and the movement of the associated dimmer to be stopped at the position determined by the part of the gap or neutral path then in line with said contact brush. The neutral path may take other forms, such as shown in Figs. 14, 16 and 17, where the neutral path is formed as an inclined edge on a pattern plate serving to control a single-pole, double-throw switch. Where the expression "gap" is used, it is, of course, to be understood as including any equivalent structure involving a pattern providing a neutral path.

Energization of one of the magnet coils will not of itself cause any change in the position of its associated dimmer but should the shaft 6 now be rotated by means of the handwheel 43, then the dimmer in question will now move either up or down, according to which of the side iron plates of each set of bevel wheels is gripped by an electromagnet.

The shaft 6 is arranged for rotation in one direction only, and the arrangement is such that whether the dimmer is going up or down, the contact brush assembly which moves in accord with it always moves toward the gap between the two contact plates. As soon as the brush reaches this gap, the supply of electricity to the magnet coils associated with these contact plates is broken and the dimmer ceases to move in conjunction with the shaft 6.

Thus, in Fig. 5 the contact brush 26a is shown in contact with the lower plate 16a and the effect of this will be to energize the coil 12a which will cause the dimmer to increase in brightness when the shaft 6 is rotated and at the same time cause the contact brush 26a to also move in an upward direction towards the gap 17a. As soon as the brush reaches this gap it will break the supply of electricity to either contact plate 15a or 16a and the dimmer will remain stationary and cease to move in accord with the rotation of shaft 6. Alternatively, had the contact brush 26a been touching contact plate 15a, then the other magnet coil in the set, i. e. 13a, would have been energized with the result that the dimmer would have moved in the opposite direction and the contact brush 26a would have moved downwards towards the gap 17a.

The position of the gap between the two contact plates of each set therefore determines the stopping position of each dimmer. It will be seen from Fig. 4 that the position of the gap between each pair of contact plates varies along the length of the plates. Furthermore, that the position of the gap between any one pair of contact plates varies at any given point along the length of the plates relative to one or more of the other sets of plates. Thus, in Fig. 4 the four contact brushes 26a, 26b, 26c, 26d are shown at a position in the middle of the length of the four pairs of contact plates, and in each case the brush is in contact with the lower plate of each pair, thus energizing magnets 12a, 12b, 12c and 12d, and causing all four dimmers to increase in brightness when the shaft 6 is rotated. The four contact brushes will at the same time move in an upward direction until each brush reaches the gap between the contact plates and both dimmers and brushes will remain stationary.

The base 18 upon which the four pairs of contact plates are mounted, is, however, slidably mounted in a frame 29 and can be moved in either direction at right-angles to the arc of travel of the contact brushes. Thus, in Fig. 4 it will be seen that the base 18 can move either to the left or the right of the position shown. This movement is achieved by means of a rack and pinion 33 and 32 in the construction under consideration but any suitable means can be employed. For example, in some constructions it might be desirable to cause the desired movement of the base 18 to take place as the result of turning a wheel or knob or by moving a lever located further away from or even at a distance from the base 18 in question.

Movement of the base 18 to a new position relative to the contact brushes 26a, 26b, 26c, 26d, will enable the gap between any pair of contact plates to be located in a new position relative to the path of travel of the associated contact brush, and the dimmer concerned will be given a new stopping position in accord with the position of the gap.

It will be seen that since all four sets of contact plates are mounted on the same base, they are moved as one unit when the base in question is moved, and the whole assembly becomes one compound contact-plate movable member. Together with the four movable brush-holders and brushes it forms one compound switch mechanism in which the base is moved as a single member to vary the location of the breaking points of the switch ways. During normal operation of this compound switch mechanism the supply of electricity to it is constant and displacement of part of the switch relative to the other part or parts determines the breaking point of any of the switch circuits. During normal operation of this compound switch mechanism the supply of electricity to the brushes is constant and displacement of part of the switch relative to the other part or parts determines the breaking point of any of the switch circuits. That is to say, this switch mechanism does not depend upon any external or additional apparatus or means to energize or determine the energization of the switch brushes or to determine the stopping points of these switch brushes.

It will be seen that movement of the movable base member of the compound switch mechanism simultaneously affects all the sets of contact plates and each of the dimmers can if desired be given a new stopping position. Thus, if the gaps between the contact plates are located beforehand to correspond with the desired position of the dimmers, movement of the movable contact plate member to a certain position will enable all the dimmers to be simultaneously moved to the predetermined positions as and when the shaft 6 is rotated. The dimmers will then directly move to the predetermined positions at a speed corresponding to the speed of rotation of the shaft 6.

In the construction shown in the accompanying drawings the shaft 6 is rotated by means of the handwheel 43 but any convenient means for turning this shaft may be employed such as an electric motor. When a number of separate sets of control apparatus according to this invention are grouped together, means may be provided to allow some or all of these shafts to be simultaneously rotated or rotated at different speeds.

While the pairs of contact plates have been so far shown as mounted on a common base 18 so that the relationship of the contact plates to the contact brushes may be simultaneously affected, if desired the contact plates may be mounted on a separate base for each pair, provided that they move together or can be made to move together as one unit. Means may, however, be provided to adjust the relationship of any pair of contact plates relative to the other pairs of contact plates.

The contact plates have been shown as mounted on an oblong base which is slidably mounted, but if desired the contact plates may be mounted on the face or periphery of a wheel or drum arranged to rotate or may be mounted in any other convenient manner.

It has been shown that movement of the movable base member of the compound switch mechanism will enable predetermined combinations of dimmer positions to be reproduced. In Figs. 1, 2 and 6 a pointer 36 is shown moving over a scale or name plate so that by turning the knob 35 an operator will be able to move the movable base member to the desired position. Any desired number of stopping positions for pre-set dimmer arrangements may be embodied in the apparatus described above.

The movable base member of the compound switch mechanism can also be arranged to be moved in another sense so that in addition to change of position as already described, it can also be moved nearer to the pivoting points 22a, 22b, 22c, 22d of the brush-holders 23a, 23b, 23c, 23d. In Fig. 4 it will be seen that the frame 29 which carries the slidable contact base 18 is in itself slidably mounted in another frame, 38, and can be moved at right-angles to the sliding movement of base 18 by means of a rack 41 (see also Fig. 2) and pinion 39 which is mounted on a shaft 40 and turned by handwheel 42. Thus, this whole switch base assembly can be varied in its distance from the pivoting points described above. This does not affect the movement of the slidable base as the pinion 33 (see Figs. 1 and 2) is wide enough to remain in engagement with the rack 32 at all positions of the frame 29.

One means for automatically proportioning the light intensity of the several light sources will now be described. It will be seen from Fig. 5 that when the contact plates 15a and 16a are moved from position AA to another position BB which is nearer to the pivoting point of the brush-holder 23a, the contact brush 26a is pressed into the brush-holder and it will have to move through a greater angle to reach the gap 17a unless this gap is located in direct line through the brush and brush-holder. Thus, in Fig. 5 the arc of travel of the contact brush will be increased from CC to C'C' when the contact plates are moved from AA to BB in order to reach the gap or neutral path 17a. Inasmuch as the movement of the brush is related to the movement of the dimmer associated with it, the dimmer will travel further when the contact brush moves from the horizontal position shown in Fig. 5 to the gap 17a when this is located on the line BB.

When calculating the positions of the gaps between the contact plates, it is arranged that the lowest position of a dimmer shall be reached when the gap is directly in line through the contact brush and holder. To get full light from a dimmer, the gap is situated so that the contact brush and arm have to travel through the maximum arc of travel. The maximum arc of travel is only reached when the contact plates are at the shortest distance from the pivoting points of the brush-holders, i. e. in Fig. 5 at BB. To get full light from any of the dimmer circuits, it is necessary for the movable base member 18 to be at its nearest position to the pivoting points of the brushholders, i. e. at position BB in Fig. 5. The dimmers will then take up their relative positions as determined by the position of the gaps between the contact plates and the maximum overall lighting intensity will be obtained from the lighting apparatus controlled by the dimmers.

When by movement of the wheel 42 the movable base member 18 is taken further away from the pivoting points of the brush-holders then on the line BB then the dimmers will take up the same relative position to each other, but since the contact brushes 26a, 26b, 26c, 26d will now move through a smaller arc of travel in order to reach the gaps between the contact plates, the dimmers will stop further away from the "full light" positions thus giving a lower overall lighting intensity.

While no difficulties are experienced in causing the dimmer arms in the dimmers to stop short of their extreme "full light" position, it is important that at the opposite end of their travel these dimmer arms are not required to go beyond the "full out" position as with most designs of dimmer the arms cannot travel beyond this point. Thus, while all the dimmers in a combination can be made to stop further away from the "full light" positions as explained in previous paragraphs, movement of the dimmer arms must always stop when they reach their "full out" positions. This is ensured by arranging that the gap between each pair of contact plates corresponds to the "full out" position of a dimmer when this gap is directly in line with the brush-holder when this is at right-angles to the thrust of the contact plate assembly. At this position variation of the distance between the contact plates and the pivoting point of the brush-holder makes no difference to the relative position of the gap and contact brush. It is only when the contact brush is not at right-angles that there is a variation in its arc of travel in order to reach a given position of the gap between a pair of contact plates.

According to this invention, the dimmers will always stop at the "full out" positions together regardless of their different starting points, assuming that this effect is required. From the foregoing, it will be seen also that variation of the distance between the contact plates and the pivoting points of the brush-holders will affect all the dimmers in proportion to their relative positions. Thus, if the arc of travel is reduced, say, by 25% for a dimmer at "full light" position, the arc of travel of other dimmers giving various strengths of light will also be reduced by approximately the same amount, so that another dimmer, say at one half of full light, will have its travel reduced by 25% of one half. Thus, the overall intensity of light provided by dimmer circuits at various strengths can be varied without upsetting the proportion of light provided by the different dimmer circuits. If desired, the apparatus can be constructed so that dimmers can be caused to move from "full light" to "loss of light" simply as the result of moving the base 18 far enough away from the pivoting points of the brush-holders and then operating the shaft 6.

From the foregoing description of the control apparatus, it will be seen that lighting effects can be tried out experimentally by means of the individual dimmer operating handles 14a, 14b, 14c, 14d, and when the desired effects are known, contact plates are cut and fitted in the compound switch mechanism. By fitting scales at the side of the dimmer operating handles the corresponding position of the gap between a pair of contact plates can be easily ascertained. The desired combinations of dimmer positions can then be reproduced in any desired order by operating the mechanism as described. Furthermore, the overall intensity of any lighting combination can be varied without disturbing the relative strengths of the lighting circuits.

As an alternative to fitting new contact plates or strips, etc., as shown in the previous paragraph, each pair of contact plates may be replaced by a series of adjustable members of the type shown in Fig. 9, mounted in a row as shown in Fig. 10. Each unit member (see Fig. 9) according to this particular construction which is cited as an example, consists of two metal contact strips 54 and 53 mounted with a gap between them on an insulated base 55. These two contact strips are electrically insulated from each other, but make contact one at either end with common conductors for the row, so that all the contact plates coming below the gap between plates are electrically connected to one common conductor 60, while all the contact plates coming above the gaps are electrically connected to another common conductor 59. These conductors cause a row of such members to correspond electrically to a pair of contact plates of the type described earlier in this description. It will be seen in Fig. 10 that the circular units are so mounted in a common base that only a small part of the surface projects beyond the insulated surface of the base 57, this projection being shown at 58r, 58s, 58t, 58q.

The contact brushes 26a, 26b, 26c, 26d, engage with the fore-mentioned surfaces 58r, 58s, 58t, 58q, and the slidable base 57 is mounted so that its stopping positions always bring the contact brushes against one circular contact member in each row.

Each circular contact member is mounted so that when the setscrew 58 is loosened the member may be rotated by hand until the position of the spiral gap between the two contact plates comes at the desired point in the path of travel of the contact brush associated with it. The setscrew is then tightened. In this manner the position of the gap between the electrically continuous contact plates can be varied as desired at each stopping plate of the multiple assembly. With a construction of this nature it is desirable to provide easy access to the side of the mounting base from which the adjustments are made and some kind of a scale can be mounted on or adjacent to each adjustable member corresponding, say, to the scale adjacent to the hand-operated dimmer handles 14a, 14b, 14c, 14d, so that when the desired dimmer position is known, the necessary adjustment to the contact plate circular member can be quickly carried out.

An alternative method of providing means of adjustment of the stopping positions of the dimmers, is to use the type of construction shown in Fig. 8, but to provide means for easily adjusting the position of the member 51a. For example, this can take the form of a stud fixed in a slot so that the position of the stud in this slot can be easily adjusted. In this form of construction the position of the member 51a corresponds in value to the position of the gap in the construction shown in Fig. 5.

Fig. 6 shows a perspective view of a complete apparatus constructed according to this invention, but the means of access to adjust the members just described is not shown. This access is quite easily provided, however, and, for example, part of the front cover could be removable to provide this access. While four dimmers have been assumed in the descriptions above, the apparatus is not restricted to any number, and to illustrate this a further two dimmers have been indicated by the handles 45 and 46.

Summarizing the operating of the equipment as shown in Fig. 6, it may be said that:

(a) The handles 14a, 14b, 14c, 14d, 45, 46, enable the dimmer circuits to be individually operated by hand so that among other things the desired dimmer positions may be ascertained by experiment.

(b) By means of the handwheel 35 a desired preset combination of dimmer positions may be preselected, in conjunction with scale 37.

(c) The selection can be carried into effect by operation of the handwheel 43.

(d) The overall intensity of the lighting provided by all the dimmer lighting circuits can be selected for reduction or increase before or after a selected combination of dimmer positions has been carried into effect, by operation of the handwheel 42.

(e) Adjustments of the dimmer positions can be pre-set by opening up one or more of the panels which enclose the apparatus, and either fitting new contact plates or strips in the compound switch mechanism, or adjusting contact members provided for this purpose as shown, for example, in Figs. 9 and 10.

The construction so far considered according to this invention concerns manually operated apparatus. If desired, however, any or all of the operations concerned in the working of the apparatus may be operated automatically by any desired means such as hydraulic or electric power.

Apparatus can be constructed according to this invention whereby a sequence of lighting changes can be automatically produced by the control apparatus in accordance with predetermined requirements. In one form of construction the movable base member of the compound switch mechanism is circular so that the contact plates or strips may be rotated continuously in one direction. The shaft 6 is continuously rotated by electrical or other means while the movable base member just described is inched round at intervals. These intervals can be of a certain duration regardless of the time required for any lighting change, or means may be provided to inch the member round to its next position as soon as a lighting change has been completed. One means of accomplishing the latter requirement is to cause a relay to operate as soon as there is no current flowing through the return conductor for all the electromagnetic clutch coils, this relay causing a solenoid to inch the rotatable switch base member to the next position. It will be appreciated that while a lighting change is in course of action there will be current flowing through at least one magnet coil, but as soon as all dimmers have come to rest, then there will be no current flowing through the return feed.

Referring again to Fig. 5, it will be seen that the contact brush 26a and arm 23a are at right-angles to the contact plates 15a and 16a when the brightness control is at the lowest or "dim out" position. The brightness control or dimmer is at its "full on" position when contact brush 26a is in contact with a certain position of the upper contact plate 15a. Between these extreme positions the contact point at the end of 26a moves in a straight line parallel with contact plates 15a and 16a. This path of travel is at right-angles to the position of the arm in the "dim out" position.

The constructions shown in Figs. 11 to 14 represent improved working arrangements for the contact brushes. In the construction shown in Fig. 11, better contact between the contact brush 26a and the contact plates 15a and 16a is achieved. Here the extending arm 66a does not make any electrical contact but operates with a roller 67a at one end to reduce friction and moves the contact brush 69a by means of a linking lever 68a. The contact brush 69a moves in exactly the same direction as the contact point at the end of contact brush 26a in Fig. 5, but the pressure of the brush against the two contact plates 15a and 16a remains constant. Also the distance between the pivoting point of arm 66a and a line parallel with the contact plates is capable of variation in exactly the same manner as the construction of Fig. 5.

Fig. 12 shows a further method of achieving similar results. The fork 70 will determine the line of movement of connecting pin 71 and will thus fix its distance from the fulcrum point 79 of the lever arm 72, the pin 71 being movable in slot 78 with respect to arm 72. The linking arm 73 will cause sliding bar 74 carrying contact brush 75 to move across the surface of the contact plates 76 and 77. It will be observed that movement of the fork 70 in the direction of the arrows, that is at right-angles to the position of the lever in the "dim out" position, will enable the effective length of the arm 72 to be varied and thus enable the effective strength of a particular lighting combination to be varied without alteration of the combination. A development of this construction is shown in Fig. 13 in which the fork 80 guides a roller 81 on top of the curved edge of lever 82 with a fulcrum point at 83. The roller 81 is pressed against the top of lever 82 by means of the spring 84. It will be seen that the construction of Fig. 13 is the geometrical equivalent of Fig. 5 and operates in substantially the same manner and forms the basis of the control apparatus to be described with reference to Fig. 15 et seq. The switch construction shown in Fig. 14 is designed to avoid having live contact plates and comprises a stylus pin 90 connected to but insulated from a spring arm 91, the latter carrying electrical contact points 92 and 93. The spring arm 91 is continually energized, and when in the middle position as shown in Fig. 14, the contacts 92 and 93 make no contact with contacts 94 or 195. To be in this middle or neutral position, the stylus 90 is located approximately in the center of an incline 96 which connects two levels 97 and 98 of the movable surface. When stylus 90 is moved so as to come on the lower level 97, spring arm 91 moves over by its own springiness so that the contact 92 touches contact 94 and energizes power-operated means to return the operating linkage so that the stylus will break this contact. Similarly, when stylus 90 is on the higher level 98, contact 93 touches contact 95 and energizes the same power-operated means to return the stylus to the incline. By this arrangement it will be seen that the stylus will follow the movement of this incline or neutral path over the movable surface. In fact this incline constitutes a neutral path.

In the construction shown in Figs. 15, 16 and 17, a handwheel 100 is mounted on a shaft 101 and by means of bevel gears 102 and 103 causes shaft 104 to be rotated. Shaft 104 is only intended to rotate in one direction, that is clockwise as seen in Fig. 16, and if handle 100 is turned in an anti-clockwise direction, a one way drive device 118 will cause the handle to rotate freely on shaft 101. A single complete magnetic clutch is shown in section in Fig. 17, and it will be seen that shaft 104 has fixed thereto a circular iron contact plate 105. Loosely mounted on shaft 104 but not secured to it are two circular plates 106 and 107, preferably made of aluminum or other non-magnetic material. Plate 106 carries two electromagnets 108 and 109 and plate 107 carries two similar electromagnets 110 and 111. When neither of the pairs of electromagnets are energized, the center iron plate 105 may rotate with shaft 104 without moving either of the aluminum plates 106 or 107. If the electromagnets on plate 106 are energized, they become magnetically attached to the iron plate 105, and the aluminum plate 106 will turn with iron plate 105. Similarly, when the electromagnets on aluminium plate 107 are energized, they will become attached to iron plate 105 and thus aluminium plate 107 will turn with the iron plate 105. The aluminium plates 106 and 107 are grooved on their peripheries and a wire cable drive 119 is taken from each two pulleys 112 and 113, both of which are fastened to the operating shaft 114 of dimmer 120. The single wire cable is arranged so that it passes from the top edge of plate 106 to the top edge of pulley 112, thence to the underneath of pulley 112 to the top of plate 107, thence to the underneath of plate 107 to the top of pulley 113, and from the underneath of pulley 113 to the underneath of plate 106. This arrangement which is clearly illustrated in Fig. 16, causes aluminium plate 106 to rotate in the opposite direction to the aluminium plate 107. When the electromagnets on plate 106 are energized, then the latter will turn in the same direction as the dimmer shaft 104 and aluminium plate 107 idles in the opposite direction. If, however, the electromagnets on plate 107 are energized, then the dimmer will rotate in the opposite direction as a result of the cross-over cable drive operating on the dimmer pulley 113. An advantage of this construction is that it keeps the two aluminium plates in the closest possible proximity with the iron plate.

Dimmer 120 carries on its shaft 114 a cam 121 (see also Fig. 16) rotating with pulleys 112 and 113. The outer edge of cam 121 presses against roller 122 at the end of arm 123 mounted on one end of shaft 124a. The other end of shaft 124a is fixed to an arm 125. The linkage shown in these figures for operation of the follow up devices corresponds in principle to that shown in Fig. 13 and includes roller 126 which rides on top of arm 125 and is located in position by movable fork 127, the latter being movable by means of rack and pinion 129 and 130 which move the base 128 carrying the fork backwards or forwards along the length of the arm 125. Roller 126 is carried by a linking lever 131 which is pivoted at 132 to bar 133 which slides vertically in guides and carries the switch arrangement as shown and described with reference to Fig. 14 (this switch is not shown in detail in Figs. 15 to 17). In this form of apparatus such assemblies are provided and are referred to by the same reference numbers but with suffixes a, b, c or d. While the magnetic clutches and dimmers can be spaced apart, it is preferable that the stylus pins of the switch assemblies should be located one above the other in a line perpendicular to the direction of movement of the movable surface. For this purpose it will be noted particularly in Fig. 15 that shafts 124b, and 124c, take in practice the form of a sleeve through the center of which the shafts 124a and 124b pass to enable the arms 125 to be located as closely together as possible. It will be seen from Figs. 15 and 17 that the forks 127 are located together on the same base 128 so that all the forks may move together as one unit. Movement is imparted to the movable base carrying these forks by means of rack and pinion 129 and 130. Pinion 130 is mounted on a short shaft carrying bevel wheel 135 which is driven by bevel gear 136 (see Fig. 15) mounted on a further short shaft, which latter carries at its other end a chain sprocket wheel 137. Chain 138 links sprocket wheels 137 and 139, the latter being mounted on shaft 116 which carries the control knob 117 which is mounted on the outside of the front panel of the machine. Thus, it will be seen that movement of control knob 117 causes the four forks 127 to adjust the distance of the four rollers 126, from the center of the four shafts 124.

When any dimmer is in its full "dim out" position, which means that arm 125 is horizontal, movement of fork 127 will change the position of roller 126 without in any way moving bar 133 which carries the switch assembly. Should the dimmer be "full on" or partly on, then movement of the fork will cause a change in the position of the switch assembly 134, and on movement of handwheel 100 will simultaneously give a proportional reduction of the position of all the dimmers, and consequently a proportional reduction of all the lights but, however, maintaining the same color combination. It will be appreciated that movement of the position of the switch assembly 134 does not in itself cause any movement of the dimmer control but simply determines the final position of the dimmer when the stylus pin of the brush assembly finally comes to rest on the neutral incline 96 when handwheel 100 is rotated.

The movable surface 140 is provided with four neutral paths in the form of inclines 96 and is slidably mounted in grooves 141 and 142 (Fig. 17). The bottom of this plate carries a rack 143 which engages with a pinion 144 so that rotation of the pinion will cause the surface 140 to move in one direction or the other. Pinion 144 is mounted on shaft 145 carrying at the opposite end a chain sprocket wheel 146. This sprocket wheel is linked by a chain 147 to another chain sprocket wheel 148 mounted on shaft 149, which latter carries control knob 150 projecting on the front of the machine. Movement of the control knob 150 will cause the movable surface 140 to move in one direction or the other and thus the neutral paths will also move and the relative positions of the neutral paths to the stylus pins of the switch assemblies will alter. On operation of the handwheel 100 the switch assemblies will move together with their respective dimmers until each switch locates on its respective neutral path and thus a particular color combination is selected.

In order to indicate the position of the movable surface 140 and also the color mixture involved, a scale 160 is provided (Fig. 18). Movement of the control knob will cause pointer needle 161 to move in conjunction with the movable surface 140 and the stopping position of the latter may be judged by the position of needle 161. The top end of the needle is mounted to slide along a thin bar 162 and movement is supplied to it by means of a wire cable 163 which passes over pulleys 164, 165, 166 and 167, the two ends of the wire cable being attached to opposite ends of the surface 140. The cable is crossed as shown in order that the needle 161 shall move in the same direction as surface 140. A further needle 168 and scale may be provided at the bottom of scale 162 to indicate the percentage of full light which will be obtained from a specific lighting mixture. Movement of the second needle is obtained by slidably mounting the needle at 169 on a bar 170. This needle 169 is attached to an endless wire cable 171 passing over pulleys 172 and 173 (Fig. 16). Pulley 172 is fastened to shaft 116 so that movement of the control knob 117 moves the sliding fork assemblies and also the needle 168.

It may be preferred to provide over-riding manual controls to set each dimmer independently, and in the construction shown in Figs. 15 to 17, four handles 180 are provided each of which is attached to one aluminum plate either 106 or 107. Each handle 180 may carry at its tip a push-button switch 181 to perform the function shown at 47 in the wiring diagram Fig. 7.

It will be appreciated that the handwheel 100 may be continuously rotated by means of a motor, and the speed of rotation thereof will determine the time taken for movement from one predetermined color mixture to another.

It may be desired to provide automatic or semi-automatic operation in accordance with a pre-set lighting plot, and for this purpose the schematic diagram shown in Fig. 19 may be employed. The movable surface 140 is connected by means of a wire cable 200 to a slidable assembly having a pair of contact plates 201 and 202 mounted thereon with an insulated gap 203 between them. The cable 200 will pass over pulleys 204, 205, 206 and 207, and the ends of the cable are fastened to the sides of the movable surface 140. These contact plates 201 and 202 will, therefore, move in exact accordance with surface 140. Contact plates 201 and 202 are connected with relays 208 and 209, each of which may energize electric motor 210 to run in one particular direction, for example, relay 208 may cause motor 210 to run in clockwise direction and relay 209 may cause the motor to run in an anti-clockwise direction. A series of contact plugs are provided, two of which are shown at 211 and 212. These contact plugs are energized one at a time by means of a rotary step-by-step switch 214 which moves over contact studs 215a, 215b, and the like. The switch arm is shown in contact with stud 215b which is connected to contact plug 211 and is shown as being in contact with contact plate 201. When this plate 201 is energized, relay 209 will operate to cause the motor to run in an anti-clockwise direction and to move the contact plate 201 and 202 leftward until the plug 211 comes into contact with insulating gap 203. As soon as this insulating gap is reached, relay 209 is de-energized and the motor stops, and thus a predetermined lighting combination is set.

It will be seen from Fig. 18 that three slots 216, 217 and 218 are provided into which can be inserted a number of contact plugs which make electrical contact through the front panel of the apparatus with contact plates 201 and 202. The provision of three slots enables plugs to be inserted to provide color combinations which are very close to each other on the color scale without the interference of one plug with the other due to their actual size. Each plug may be connected by an electric cable 213a, 213b and the like, which latter are connected to the corresponding studs 215a, 215b and the like on the step-by-step switch. To enable a number of lighting mixtures to be pre-set in advance, plugs are inserted in the slots in accordance with their order on the step-by-step switch and the switch itself may be operated manually or at a distance electrically by means of a motor or solenoid 219, ratchet 220, and pawl 221, which rotate the switch shaft step-by-step. The supply of electricity to the solenoid coil 219 is attained only when the relay 222 is de-energized. Relay 222 is in series with the common return feed from the magnetic clutch coils and will therefore be energized only when one or more of the clutch coils is in operation and will be de-energized when all the magnetic clutches have reached the position where their associated contact brushes are in their neutral position. Relay 222 will also be de-energized when relay 223 is energized, the latter being connected in the return feed of the electric motor 210. Thus, operation of the solenoid 219 is only possible when the motor 210 is not working and the clutches 12 and 13 are de-energized, that is, when a particular color combination has been selected.

In the case where the shaft 104 is constantly rotating by means of a motor and the lights are in process of being changed, then current will flow on the return feed from the clutch coils through the coil of relay 222, thus keeping open the contact which feeds solenoid coil 219. As soon as all the clutches come to rest, that is when the dimmers have been moved to the desired positions, relay coil 222 will be de-energized and current will now be fed to the coil of solenoid 219, the armature of which will move the rotary switch arm 213 to the next stud 215. Current will now be fed through the plunger associated with this stud in contact with the switch arm 214 to whichever of the contact plates 201 or 202 the plunger is touching, and thence to its associated relay 208 or 209 to the motor 210. Immediately current flows through the electric motor, circuit relay 223 is energized, thus breaking feed to relay 222. Relay 222 is also de-energized since the magnetic clutches are at rest, but the operation of relay 223 ensures that while the motor 210 is in action, the clutches shall remain inoperative. When the motor 210 has caused the contact plates 201 and 202 to move to the position where the insulated gap 203 is in contact with the contact plunger or plug, the supply of electricity to the motor is broken and the contact plate assembly comes to rest. Relay 223 is now de-energized and the return feed to the magnetic clutch coils is completed so that they are now free to operate according to the positions of the switch assemblies on the movable surface. Relay 222 is thus energized and breaks the supply of electricity to the solenoid coil 219 so that the solenoid armature returns by spring action to its "off" position. When the dimmers have all been moved to their new position, all the clutch coils will be de-energized and relay 222 will also be de-energized, thus causing the solenoid to function again and move the rotary switch arm 214 around to the next contact stud. The sequence just described will then be repeated. In this way a series of lighting changes can be obtained automatically as the rotary switch arm 214 is moved from one stud to another.

It will be appreciated that during the time the motor 210 is moving the contact plates 201 and 202 to a new position, the clutch coils will be inoperative owing to relay 223 breaking the return feed. Were this not the case, the dimmers would be moving at the same time that contact plates 201 and 202 were in motion. Further, the rotary switch arm is not moved from one stud to the next stud until a selected lighting mixture has been obtained, but immediately this is the case, then the solenoid is operated and switch arm 214 moves to its new position. There is, of course, no change in any lighting mixture during the period in which motor 210 is in operation. The motor 225 driving the shaft 104, will, of course, continue to rotate all the time as this has no effect on the dimmers unless any of the magnetic clutch coils is energized.

It will be appreciated that the rotary switch 214 may be operated manually on the machine itself or it may be operated electrically from a distance, as, for example, inserting a push-button switch in the connection from solenoid 219 to the relay 222. In the latter case, it will be observed that operation of the solenoid 219 will not be possible until movement of motor 210 is completed and the clutches are de-energized.

It will be understood that one electric motor could be used to provide all the necessary drives, for example, the motor 225 which as diagrammatically shown in Fig. 19 drives shaft 104, could be employed by means of reversible magnetic clutch mechanism to move the contact plates 201 and 202. In this case relays 208 and 209 would energize the clutches for effecting this movement. It may be desired to insert a timing device in the control circuit as shown, for example, at 226, so that regardless of the operation of relays 222 and 223, a fixed period of time will elapse before one lighting mixture merges into another mixture. This timing device may be of any suitable design and may, for example, open and close the circuit at 226 in a predetermined time pattern sequence.

The arrangement shown in Fig. 20 represents a means of providing an adjustable sequence of lighting mixtures. As shown, the neutral path on the movable surface is formed by the sloping ends of adjustable rods 99a, 99b, 99c, etc., which are set in position by means of grub screws. The semi-circular section of these rods allows the stylus to ride up the edge when passing from one rod to the next.

It is preferable that low voltage should be employed for the operation of magnetic clutch coils, contact switch mechanisms, etc. and especially for the contact plugs 211, 212 which are handled by the operators.

It will be noted that the constructions shown and described will serve admirably to accomplish the objects stated above. It is to be understood, however, that the constructions disclosed above are intended merely as illustrative of the invention and not as limiting as various modifications therein may be made without departing from the invention as defined by a proper interpretation of the claims which follows.

I claim:

1. In lighting control apparatus adapted to control the light intensity of a light source, the combination of an electric light source, means to control the brightness thereof, means to move said brightness control means, an operating member effectively operative always in the same direction, and means for connecting said operating member with said brightness control moving means, said last means automatically disconnecting said operating member from said moving means when said light source has been adjusted to a predetermined intensity, while said operating member may continue to operate in the same direction.

2. The combination in accordance with claim 1 in which the operating member is a shaft mounted for rotation in one direction only.

3. The combination in accordance with claim 1 in which the operating member is a shaft arranged for rotation in one direction only, and the connecting and disconnecting means comprise electrically actuated clutches.

4. The combination in accordance with claim 1 in which the operating member is a shaft arranged for rotation in one direction only, and reversible driving connections from said shaft to said brightness control means to move said brightness control means in either direction.

5. The combination in accordance with claim 1 in which the operating member is a shaft arranged for rotation in one direction only, and reversible driving connections from said shaft to said brightness control means to move said brightness control means in either direction, said driving connections including a pair of electrically energized clutches with means for energizing one only of said pair of clutches at a time.

6. The combination in accordance with claim 1 in which the operating member is a shaft arranged for rotation in one direction only, and the connecting and disconnecting means comprise electrically actuated clutches for transmitting at times the movement of said shaft to the brightness control moving means, and switch means for the magnetic clutches, a switch control pattern for said light source and connections from said brightness control means to said switch means to move said switch means relative to said pattern until the switch is actuated by said pattern, whereby said brightness control means is moved to a position determined by said pattern.

7. In lighting control apparatus adapted to control the light intensity of a light source, the combination of a light source, means to vary the intensity of such source, electrically energized means for adjusting said varying means, means to control said electrically energized means including a switch pattern and cooperating switch means actuated with said electrically energized means, and means to relatively position said switch means and pattern so as to present at will different parts of said pattern for cooperation with said switch means.

8. The combination in accordance with claim 7, said switch pattern comprising a pair of conductors separated by a gap and said switch means always moving, when operating, toward said gap to break the circuit to said electrically energized adjusting means, whereby said intensity varying means is adjusted under control of said pattern.

9. In lighting control apparatus adapted to control the individual light intensity of a plurality of light sources, the combination of a plurality of light sources, individual means for each light source to control the brightness thereof, individual means to move said respective brightness control means, and a common operating member movable always in the same direction, means for connecting said operating member with said brightness control moving means for operating said moving means, and means for successfully disconnecting said operating member from said individual moving means after it has moved each brightness control means to a predetermined position, while said operating member may continue to move in the same direction.

10. In lighting control apparatus adapted to control the individual light intensity of a plurality of light sources, the combination of individual means for each light source to vary the intensity thereof, individual electrically energized means for adjusting said respective varying means, means to control said electrically energized means including a switch pattern for each light source, a cooperating switch contact for each pattern, means for moving said switch contacts, and means for adjusting the relative initial positions of the switch contacts and patterns to present at will different parts of said patterns for cooperation with said respective switch contacts.

11. In lighting control apparatus a plurality of light sources, individual means to vary the intensity of each light source, individual electrically energized means for adjusting said respective varying means, means to control said electically energized means including a switch pattern for each light source, switch means movably cooperating with and controlled by the conformation of said patterns respectively, means to cause relative placement of the switch means and patterns to present at will different parts of said patterns for cooperation with said respective switch means, said electrically energized means comprising a rotatable member and electrically energized clutches, at least one for each light source, whereby rotation of said member in one direction simultaneously adjusts said intensity varying means to respectively increase or decrease the intensity of said light sources each to a value predetermined by their respective patterns.

12. The combination in accordance with claim 11 in which the operating member is a shaft arranged for rotation in one direction only, and said electrically energized means are so constructed that rotation of said shaft in one direction may operate said varying means in either direction in response to the control of their respective patterns.

13. In lighting control apparatus the combination of a plurality of light sources, individual intensity varying means for each light source, individual electrically energized means for adjusting said respective varying means, means to control said electrically energized means including a switch pattern for each light source and switch means controlled by the conformation of said patterns respectively, means to initially relatively adjust the switch means and patterns so as to present at will different parts of said patterns for cooperation with said respective switch means, said electrically energized means comprising a rotatable operating member and electrically energized clutches, two for each light source, energized under control of its respective pattern to clutch said operating member to said varying means to increase or decrease the intensity of said respective light sources as predetermined by said switch patterns, said clutches being respectively de-energized after said respective varying means have been adjusted to a position predetermined by their respective patterns.

14. In lighting control apparatus adapted to control the light intensity of a light source, the combination of means adapted to vary the intensity of such source, electrically energized means for adjusting said varying means, means to control said electrically energized means including a switch control plate one edge of which is formed as a predetermined pattern comprising a neutral path and switch means operated by said electrically energized means to cooperate with said control plate, and means to relatively move the switch means and pattern control plate to present at will different parts of said pattern for cooperation with said switch means.

15. The combination in accordance with claim 14 said control plate comprising two electroconductive contact members separated by a neutral paths, and switch means comprising a contact brush cooperating with said contact members.

16. The combination in accordance with claim 14 in which the neutral path is formed as an inclined edge of said control plate and the said switch means comprises a single-pole double-throw switch having a neutral position and having an actuating member coacting with the inclined edge of said control plate so that the switch is in the neutral position when the actuating member bears on the inclined portion of the pattern and closes one circuit when the actuating member is at a higher point on said edge or on the surface of the pattern plate and closes another circuit when the actuating member is on a lower point on said edge or is not in engagement with the pattern plate.

17. The combination according to claim 13 in which the switch pattern for each light source is formed as an insulating gap between a pair of electroconductive plates connected electrically respectively with the electric clutches for controlling the adjustment of the respective varying means and in which the switch means is constituted by a contact brush for each light source cooperating with said respective pair of contact plates.

18. The combination according to claim 13 in which the switch pattern for each light source constitutes a plate formed with an inclined pattern edge and each said switch means comprises a single-pole double-throw switch having a neutral position and having an actuating member coacting with said pattern so that the switch is in the neutral position when the actuating member bears on the inclined portion of the pattern and closes one circuit when the actuating member is at a higher point on said incline or on the surface of the pattern plate and closes another circuit when the actuating member is on a lower point on said incline or is not in engagement with the pattern plate.

19. The combination in accordance with claim 14, together with means operated with said varying means for moving said switch means toward the neutral path of said pattern so as to cause said pattern to operate said switch means to break the circuit to said electrically energized adjusting means, whereby said intensity varying means is adjusted under control of said pattern control plate.

20. The combination according to claim 13, together with means operated by said respective electrically energized means for moving said respective switch means with respect to the respective patterns to break the circuit to their respective electrically energized clutches, whereby operation of the respective varying means is terminated under control of their respective patterns.

21. In lighting control apparatus adapted to adjust the individual light intensity of a plurality of light sources, the combination of individual means for each light source adapted to control the brightness thereof, individual means adapted to actuate said respective brightness control means, means for operating said actuating means, comprising switch plates and cooperating contacts to control the operation of said actuating means to provide a predetermined relative intensity of said light sources, and means for initially adjusting said brightness control means for varying the intensity of the light sources proportionately, to vary the overall intensity of the resultant light.

22. In light control apparatus adapted to adjust the individual light intensity of a plurality of light sources, the combination of individual means for each light source adapted to control the brightness thereof, individual servo-mechanisms adapted to operate said respective brightness control means, individual sets of cooperating contact members for controlling said servo-mechanisms respectively, and means for concomitantly relatively moving said contact members to vary the parts of each pattern effective to control said servo-mechanisms.

23. The combination in accordance with claim 22, together with means for proportionately varying the response of each of said servo-mechanisms to the control of said patterns.

24. In lighting control apparatus adapted to produce a desired resultant color by adjusting the individual light intensity of a plurality of light sources of different colors, the combination of individual means for each light source to control the brightness thereof, individual electrically energized means for moving said respective brightness control means, means to control said several electrically energized means including switch control plates one for each light source, each of said plates forming a neutral path of predetermined pattern and individual switch means movably cooperating with and controlled by the conformation of each pattern, and means to initially adjust the relative position of said plates and switch means so as to present at will different parts of each of said patterns for cooperation with their respective switch means, whereby each light source is caused to emit light of predetermined intensity and the resultant light mixture will produce the predetermined color effect.

25. The combination according to claim 24, together with means for varying the intensity of each light source proportionately whereby the overall intensity of the resultant light may be varied without changing the color thereof.

26. A color lighting system including a plurality of colored light sources, a dimmer for each light source, operating means for each dimmer, a pair of electrically-actuated clutches for each operating means to drive in the dimming or the brightening direction, follow-up means connected to each operating means, a movable surface and a neutral path on the surface for each follow-up means, and circuit connections including said clutches, movable surface and follow-up means whereby each follow-up means will energize one or the other of the respective clutches if the follow-up means is away from its neutral path to cause movement of the follow-up means back to its neutral path.

27. In a color lighting system as claimed in claim 26, means for relatively positioning the surfaces and follow-up means to obtain varying color lighting effects.

28. A color lighting system as claimed in claim 26, wherein each neutral path comprises an insulating space between two metal contact surfaces and the follow-up means comprises an electrical conducting brush.

29. A color lighting system as claimed in claim 26, wherein the neutral path comprises an inclined surface between two different levels on the movable surface and the follow-up means comprises a single-pole double-throw electrical switch.

30. In the combination according to claim 10 at least one additional switch means cooperating with said switch control pattern and means for periodically making only one of said switch means effective.

31. In the combination according to claim 10 at least one additional switch means cooperating with said switch control pattern and a motor driven multi-circuit selector switch for periodically making only one of said switch means effective.

32. In the combination according to claim 10 at least one additional switch means cooperating with said switch control pattern, a motor driven multi-circuit selector switch for periodically making only one of said switch means effective, and means for stopping said selector switch while said varying means is undergoing adjustment.

33. In the combination according to claim 10 at least one additional switch means cooperating with said switch control pattern, a motor driven multi-circuit selector switch for periodically making only one of said switch means effective, and a relay in the circuit for the driving motor for said selector switch operated by said electrically energized means adapted to stop the operation of said selector switch while said varying means is undergoing adjustment.

34. The combination according to claim 21 in which the means for varying the overall intensity of the light sources proportionately comprises a driving connection for each light source operated concomitantly with their respective brightness control means and each operating a related pattern controlled means, and means to vary equally the effectivity of each said driving connection.

35. In a color lighting system as claimed in claim 26, a driving shaft for said clutches, the follow-up means for each pair of clutches acting to connect one or the other of said two clutches to said driving shaft to operate the associated dimmer in either the dimming or brightening direction.

ROLLO GILLESPIE WILLIAMS.

References Cited in the file of this patent

UNITED STATES PATENTS

| Number | Name | Date |
|---|---|---|
| 1,682,938 | Simon | Sept. 4, 1928 |
| 1,799,789 | Gwynne | Apr. 7, 1931 |
| 1,800,446 | Frank | Apr. 14, 1931 |
| 2,057,184 | Davis et al. | Oct. 13, 1936 |